United States Patent
Qi et al.

(10) Patent No.: US 9,516,509 B2
(45) Date of Patent: Dec. 6, 2016

(54) WIRELESS COMMUNICATION IN RADAR TRANSMISSION CHANNELS

(71) Applicants: Emily Qi, Portland, OR (US); Eldad Perahia, Portland, OR (US)

(72) Inventors: Emily Qi, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 207 days.

(21) Appl. No.: 14/014,630

(22) Filed: Aug. 30, 2013

(65) Prior Publication Data

US 2014/0349669 A1  Nov. 27, 2014

Related U.S. Application Data

(60) Provisional application No. 61/826,104, filed on May 22, 2013.

(51) Int. Cl.
*H04W 16/14* (2009.01)
*H04W 76/02* (2009.01)

(52) U.S. Cl.
CPC ........... *H04W 16/14* (2013.01); *H04W 76/023* (2013.01)

(58) Field of Classification Search
CPC .................................................. H04W 16/14
See application file for complete search history.

(56) References Cited

U.S. PATENT DOCUMENTS

| | | | |
|---|---|---|---|
| 2008/0075038 A1* | 3/2008 | Jin et al. | 370/329 |
| 2009/0129273 A1 | 5/2009 | Zou | |
| 2009/0274135 A1* | 11/2009 | Seok | 370/338 |
| 2009/0310583 A1* | 12/2009 | Suzuki | 370/338 |
| 2010/0087221 A1 | 4/2010 | Srinivasan et al. | |
| 2011/0228666 A1 | 9/2011 | Barbieri et al. | |
| 2012/0314663 A1* | 12/2012 | Dwivedi et al. | 370/329 |
| 2013/0194920 A1* | 8/2013 | Chu et al. | 370/230 |
| 2014/0003293 A1* | 1/2014 | Borges et al. | 370/255 |
| 2014/0269646 A1* | 9/2014 | Ramasamy et al. | 370/338 |

FOREIGN PATENT DOCUMENTS

| | | |
|---|---|---|
| KR | 10-2010-0111346 A | 10/2010 |
| WO | 2009/009390 A1 | 1/2009 |
| WO | 2014/190004 A1 | 11/2014 |

OTHER PUBLICATIONS

International Search Report and Written Opinion received for PCT Patent Application No. PCT/US2014/038897, mailed on Sep. 24, 2014, 10 Pages.

* cited by examiner

*Primary Examiner* — Mazda Sabouri
(74) *Attorney, Agent, or Firm* — Sutherland Asbill & Brennan LLP

(57) ABSTRACT

The present disclosure relates to computer-implemented systems and methods for wireless communication in radar transmission channels. The method may include receiving, by a first computer comprising one or more processors from a second computer, a request to initiate wireless communication, the first computer in communication with a wireless access point. Additionally, the method may include determining, by the first computer, that the wireless access point is communicating in a radar transmission channel. Further still, the method may include establishing wireless peer-to-peer communication between the first computer and the second computer in the radar transmission channel.

20 Claims, 4 Drawing Sheets

WIRELESS COMMUNICATION IN RADAR TRANSMISSION CHANNELS

CROSS-REFERENCE TO RELATED APPLICATION

The present disclosure claims the benefit of U.S. Provisional Application No. 61,826,104, filed May 22, 2013.

TECHNICAL FIELD

The present disclosure generally relates to wireless communication, and in particular, wireless communication in radar transmission channels.

BACKGROUND

The Federal Communications Commission has promulgated various regulations that govern wireless communication. In particular, certain wireless and/or radio channels, which may include relatively higher bandwidth/throughput capability, may be reserved for radar signal transmission. Thus, consumer wireless devices operating in these radar transmission channels may be instructed to vacate the channel when it is to be used for radar signal transmission, such as by a government entity and/or the like. If the consumer devices are in communication with an access point (e.g., a router, etc.), the access point may provide channel management with respect to whether radar transmission channels may be used.

In some cases, however, consumer devices may wish to communicate in a radar transmission channel using a peer-to-peer communication protocol. As such, consumer devices may wish to leverage the channel management functionality of access points. To this end, the consumer devices may be configured to exchange information with respect to the access points they may be in communication with.

BRIEF DESCRIPTION OF THE DRAWINGS

Reference will now be made to the accompanying figures and diagrams, which are not necessarily drawn to scale, and wherein.

DETAILED DESCRIPTION

Figure 1:
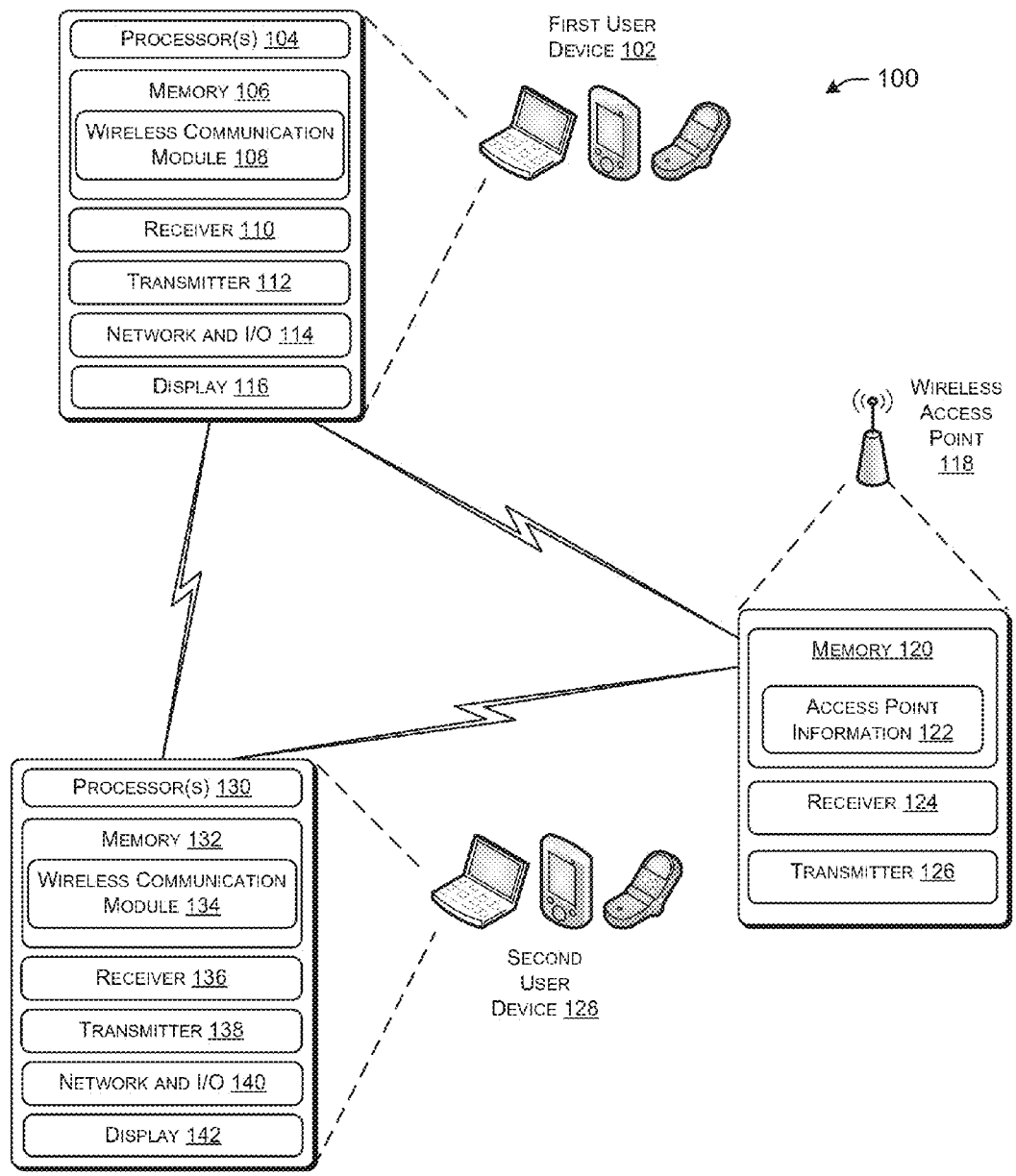
FIG. 1 shows a block diagram of a system for wireless communication in radar transmission channels, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

The present disclosure relates to computer-implemented systems and methods for wireless communication in radar transmission channels. According to one or more embodiments of the disclosure, a method is provided. The method may include receiving, by a first computer comprising one or more processors from a second computer, a request to initiate wireless communication, the first computer in communication with a wireless access point. The method may also include storing, by the first computer, a first wireless access point identifier associated with the wireless access point. Additionally, the method may include determining, by the first computer, that the wireless access point is communicating in a radar transmission channel; and receiving, by the first computer, a second wireless access point identifier associated with the second computer. The method may also include determining, by the first computer, whether the first wireless access point identifier matches the second wireless access point identifier. Further still, the method may include establishing, by the first computer based at least in part upon a positive determination that the first wireless access point identifier matches the second wireless access point identifier, wireless peer-to-peer communication between the first computer and the second computer in the radar transmission channel.

According to one or more embodiments of the disclosure, a device is provided. The device may include a transceiver.

The device may include at least one memory for storing data and computer-executable instructions. Additionally, the device may also include at least one processor to access the at least one memory and to execute the computer-executable instructions. Furthermore, the at least one processor may be configured to execute the instructions to establish communication with a wireless access point and receive, by the transceiver from a second device, discovery information associated with the second device. Additionally, the at least one processor may be configured to execute the instructions to determine, based at least in part on the discovery information, whether the second device is in communication with the wireless access point and determine whether the wireless access point is operating in a radar transmission channel. The at least one processor may also be configured to execute the instructions to establish, upon a positive determination that the second device is in communication with the wireless access point and upon a positive determination that the wireless access point is operating in a radar transmission channel, a wireless peer-to-peer connection with the second device in the radar transmission channel.

According to one or more embodiments of the disclosure, a non-transitory computer-readable medium is provided. The non-transitory computer-readable medium may have embodied thereon instructions executable by one or more processors. The instructions may cause the one or more processors to establish communication with a wireless access point and receive, from a second device, discovery information associated with the second device. Additionally, the computer-readable medium may include instructions to determine, based at least in part on the discovery information, whether the second device is in communication with the wireless access point and determine whether the wireless access point is operating in a radar transmission channel. Moreover, the computer-readable medium may include instructions to establish, upon a positive determination that the second device is in communication with the wireless access point and upon a positive determination that the wireless access point is operating in a radar transmission channel, a wireless peer-to-peer connection with the second device in the radar transmission channel.

The above principles, as well as perhaps others, are now illustrated with reference to FIG. 1, which depicts a system 100 for wireless communication in a radar transmission channel. The system 100 may include a first user device 102 having one or more computer processors 104, a memory 106, which may store a wireless communication module 108, a receiver 110, a transmitter 112, network and input/output (I/O) interfaces 114, and a display 116 in communication with each other. The system 100 may also include a second user device 128 having one or more computer processors 130, a memory 132, which may store a wireless communication module 134, a receiver 136, a transmitter 138, network and input/output (I/O) interfaces 140, and a display 142 in communication with each other.

The computer processors 104/130 may comprise one or more cores and may be configured to access and execute (at least in part) computer-readable instructions stored in the memory 106/132. The one or more computer processors 104/130 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102/128 may also include a chipset (not shown) for controlling communications between the one or more processors 104/130 and one or more of the other components of the user device 102/128. In certain embodiments, the user device 102/128 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/132 may comprise one or more computer-readable storage media (CRSM). In some embodiments, the memory 106/132 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/132 may store an operating system that includes a plurality of computer-executable instructions that may be implemented by the computer processor 104/130 to perform a variety of tasks to operate the interface(s) and any other hardware installed on the user device 102/128. The memory 106/132 may also store content that may be displayed by the user device 102/128 or transferred to other devices (e.g., headphones) to be displayed or played by the other devices. The memory 106/132 may also store content received from the other devices. The content from the other devices may be displayed, played, or used by the user device 102/128 to perform any necessary tasks or operations that may be implemented by the computer processor 104/130 or other components in the user device 102/130.

The network and I/O interfaces 114/140 may also comprise one or more communication interfaces or network interface devices to provide for the transfer of data between the user device 102/128 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102/128 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2012, published Mar. 29, 2012), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102/128 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 116/142 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

The system 100 may also include one or more wireless access points 120, which may also include a memory 120, which may store channel information 122, as well as a receiver 124 and a transmitter 126.

Broadly, the first user device 102 and the second user device 128 may wish to establish a wireless peer-to-peer connection (e.g., a Wi-Fi Direct connection) in a radar transmission channel. In certain embodiments, the radar transmission channel may be operable in a 5 Gigahertz frequency band and may include relatively high bandwidth capabilities. Additionally, in some implementations, the radar transmission channel may be referred to as a dynamic frequency selection (DFS) channel. However, the Federal Communications Commission (FCC) may impose certain regulations that reserve one or more radar transmission channels for radar signal traffic. Thus, if radar signals are to be transmitted on a radar transmission channel, and consumer devices operating on the channel may be required to vacate the channel.

Therefore, for devices communicating in a wireless peer-to-peer connection in a radar transmission channel, FCC regulations may instruct for at least one of the devices to operate as a DFS master of the wireless peer-to-peer connection. A DFS master may be configured to perform certain channel management duties, such as determining and/or detecting that the radar transmission channel is to be vacated due to radar signal traffic. In order to perform such DFS channel management duties, the DFS master may experience increased processing and power consumption.

Alternatively, in certain situations, the FCC may allow user devices 102/128 to communicate via a wireless peer-to-peer connection in a radar transmission channel without any of the user devices 102/128 performing radar detection duties. For instance, such communication may be allowed if the user devices 102/128 are associated with a wireless access point (e.g., a router, and/or any other type of device) capable of performing DFS master duties (e.g., channel management such as radar detection and/or the like), and if the user devices 102/128 operate on the same frequency and channel as the wireless access point. Furthermore, if the wireless access point broadcast instructions and/or requests to vacate the radar transmission channel, the user devices 102/128 may comply and re-establish the wireless peer-to-peer connection in a non-radar transmission channel.

As a result of the above scenario, the first user device 102 and the second user device 128 may wish to exchange access point information to determine whether they may be associated with the same wireless access point. Such an exchange may in turn facilitate a determination as to whether the user devices 102/128 may establish a wireless peer-to-peer communication in a radar transmission channel. For example, in order to initiate a wireless peer-to-peer connection, the first user device 102 and the second user device 128 may enter into a device discovery phase to determine certain initial connection information with respect to the devices 102/128. In the context of the Wi-Fi Direct standard, the device discovery phase may include the transmission and/or receipt of various communication frames including, but not limited to, a Probe Request frame, a Probe Response frame, a Provision Discovery Request frame, a Provision Discovery Response frame, an Invitation Request frame, an Invitation Response frame, a Group Owner (GO) Negotiation Request frame, a GO Negotiation Response frame, and/or a GO Negotiation Confirmation frame. In order to facilitate the device discovery phase, the wireless communication module 108 of the first user device 102 may communicate with the wireless communication module 134 of the second user device 128. As part of this communication, the wireless communication modules 108/134 of the user devices 102/128 may exchange access point information with respect to each user device 102/128. It will be appreciated that access point information may be exchanged in any other types of frames whether or not they are a part of the discovery phase. For example, access point information may be transmitted/received in management frames, control frames, data frames, and/or the like.

Figure 2:
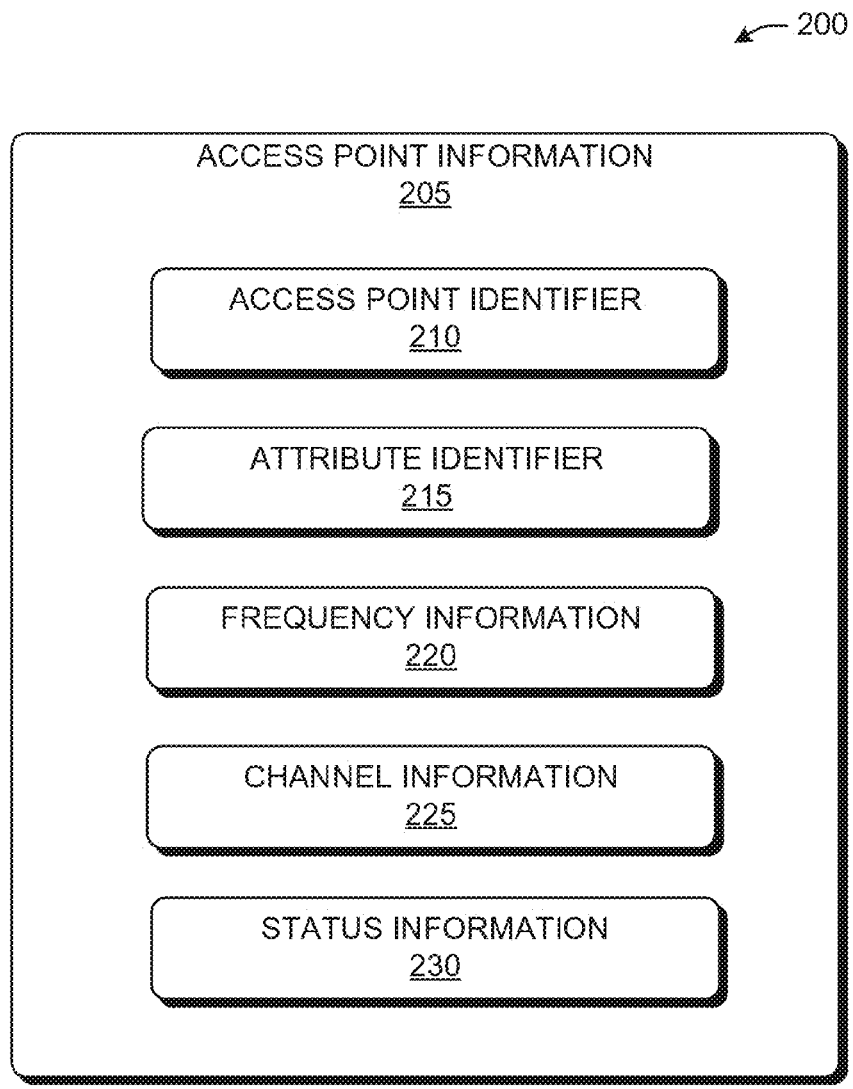
FIG. 2 shows a block diagram of access point information for wireless communication in radar transmission channels, according to one or more example embodiments.

FIG. 2 provides a block diagram 200 illustrating various data that may be included in the access point information 205 in accordance with one or more example embodiments. In some implementations, the access point information 205 for respective wireless access points may be stored on the user devices 102/128. Access point information 205 may include, but is not limited to, an access point identifier 210, and attribute identifier 215, frequency information 220, channel information 225, and/or status information 230. In certain implementations, the access point identifier 210 may include any data that may identify a wireless access point (e.g., wireless access point 118) such as a Media Access Control (MAC) address, a basic service set identification (BSSID), and/or the like). The attribute identifier 215 may include information indicating the type of access point information 205 being communicated (e.g., whether the information is an access point identifier 210, frequency information 220, channel information 225, and/or status information 230). The frequency information 220 may include data indicating the frequency band at which the associated wireless access point (e.g., wireless access point 118) is operating while the channel information 225 may include data indicating the channel number at which the associated wireless access point is operating. The status information 230 may include data indicating the relationship status between a user device 102/128 and the associated wireless access point. For example, the status information 230 may indicate that a user device 102/128 is currently in communication with the wireless access point. Alternatively, the status information 230 may indicate that the user device 102/128 is not currently in communication with the wireless access point, but can still detect the presence of the wireless access point. It will be appreciated that any other types of status information 230 may also be included in access point information 205.

Referring back to FIG. 1, once the access information 205 have been communicated between the wireless communication modules 108/134 of the user devices 102/128, the first user device 102 and/or the second user device 128 may be configured to determine whether they are in communication with the same wireless access point (e.g., wireless access point 118). For example, the first user device 102 may be in communication with wireless access point 118 and may be configured to store first access point information associated therewith. The first access point information may include a first access point identifier that identifies the wireless access point 118. Additionally, the first user device 102 may receive second access point information from the second user device 128. The second access point information may include a second access point identifier. As such, the first user device 102 may be configured to determine whether the first access point identifier matches the second access point identifier.

Upon a positive determination of a match, the first user device 102 may determine and/or conclude that the second user device 128 is also in communication with the wireless access point 118. Furthermore, the first user device 102 may also be configured to determine whether the wireless access point 118 is operating in a radar transmission channel. To this end, if the first user device 102 determines that the second user device 128 is also in communication with the wireless access point 118 and that the wireless access point 118 is operating in the radar transmission channel, the first user device 102 may then determine and/or conclude that a wireless peer-to-peer connection in the radar transmission channel may be established with the second user device 128.

According to one or more example embodiments, the first user device 102 and the second user device 128 may have established a wireless peer-to-peer connection in a radar transmission channel. Subsequently, the user devices 102/128 may receive a broadcast signal, such as from wireless access point 118, instructing the user devices 102/128 to vacate the radar transmission channel. As a result, the user devices 102/128 may comply with the instructions and re-establish the wireless peer-to-peer connection in a non-radar transmission channel (e.g., a 2.4 Gigahertz band).

In other implementations, the second access point information received by the first user device 102 may indicate that though the second user device 128 is not in communication with the wireless access point 118, the second user device 128 may still be able to detect the presence of the wireless access point 118. For instance, the first user device 102 may receive second access point information from the second user device 128. The second access point information may include a second access point identifier matching the first access point identifier. In addition, the second access point information may include status information indicating that the second user device 128 is not communicating with the wireless access point 118, but can still detect the wireless access point 118. Moreover, the first user device 102 may determine that the wireless access point 118 is operating in the radar transmission channel. Under this scenario, the first user device 102 may determine that a wireless peer-to-peer connection in the radar transmission channel may be established with the second user device 128 so long as the first user device 102 is designated as the group owner for the peer-to-peer connection. According to certain implementations, as a group owner, the first user device 102 may be configured to manage certain aspects of the wireless peer-to-peer connection, such as membership into the wireless peer-to-peer connection and/or various other management duties In yet other example embodiments, the first user device 102 and the second user device 128 may exchange access point information 205 in order to determine a communication channel with relatively low interference. For example, the exchanged access point information 205 may include frequency information 220 and channel information 225 for respective wireless access points in communication with the first user device 102 and the second user device 128. Based on the above information, the first user device 102 and/or the second user device 128 may establish a wireless peer-to-peer connection in a frequency and channel that is different from at least one of their respective wireless access points. As such, the wireless peer-to-peer connection may experience a greater likelihood of avoiding channel interference and relatively higher throughput.

Figure 3:
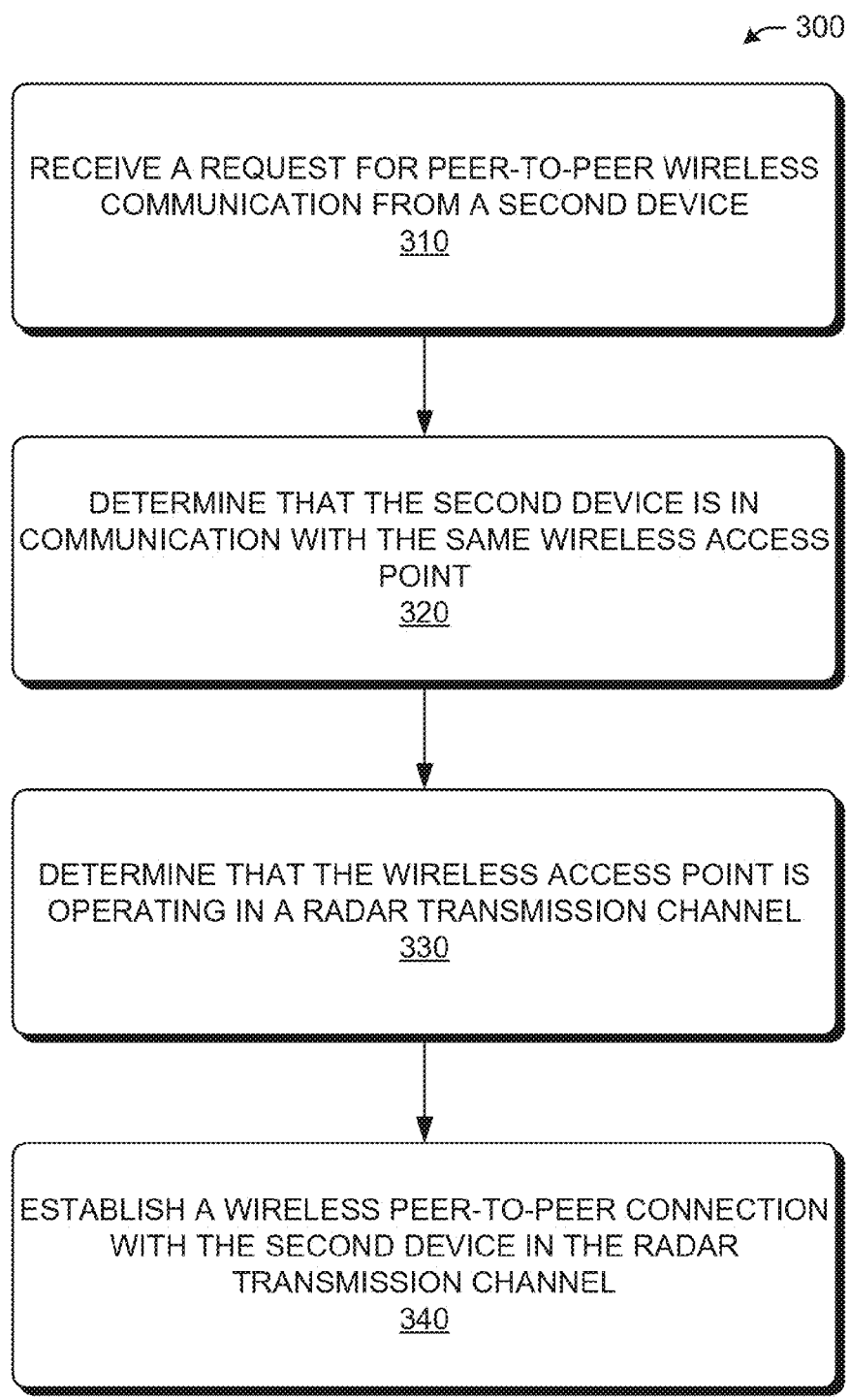
FIG. 3 show a flow diagram for wireless communication in radar transmission channels, according to one or more example embodiments.

Referring now to FIG. 3, a flow diagram of a method 300 is illustrated depicting wireless communication in a radar transmission channel in accordance with one or more example embodiments. The method 300 may provide a the general operation of establishing a wireless peer-to-peer connection between two user devices (e.g., first user device 102 and second user device 128) in a radar transmission channel. As such, the method 300 may begin in block 310, where a first user device 102 may receive a request for peer-to-peer wireless communication from a second user device 102. Furthermore, the first user device 102 may be in communication with a wireless access point 118. In block 320, the first user device 102 may determine that the second user device 128 is in communication with the same wireless access point 118. In block 330, the first user device 102 may further determine that the wireless access point 118 is operating in a radar transmission channel. In block 340, the first user device 102 may establish a wireless peer-to-peer connection with the second user device 128 in the radar transmission channel.

Figure 4:
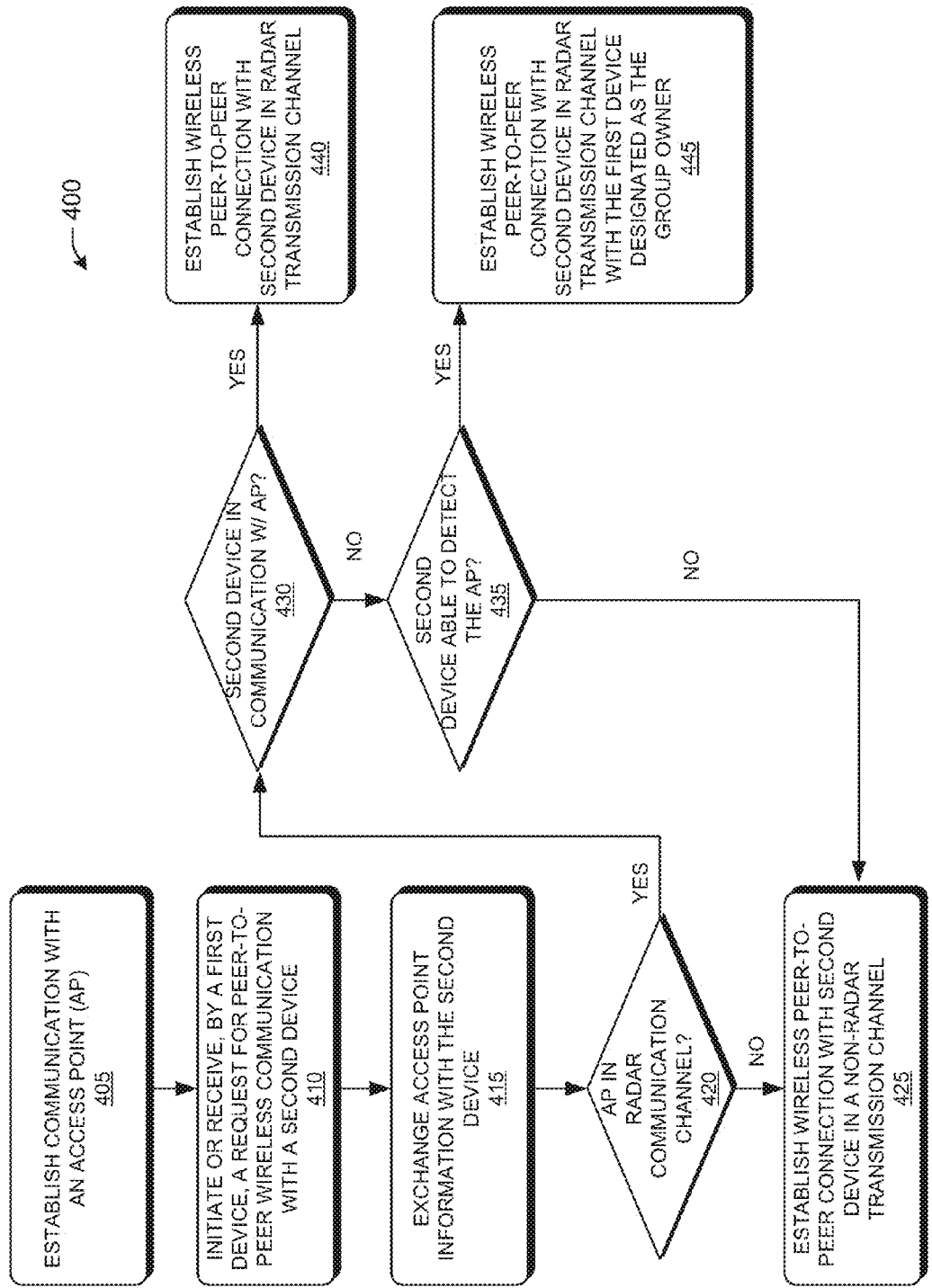
FIG. 4 shows a flow diagram for wireless communication in radar transmission channels, according to one or more example embodiments.

Referring now to FIG. 4, a flow diagram of a method 400 is illustrated depicting wireless communication in a radar transmission channel in accordance with one or more example embodiments. The method 400 may begin in block 405 where a first user device 102 may establish communication with a wireless access point 118. In block 410, the first user device 102 may initiate and/or receive a request for wireless peer-to-peer communication with a second user device 128. For instance, the first user device 102 and the second user device 128 may enter into a device discovery phase for exchanging certain information that may be used to establish a wireless peer-to-peer connection. To this end, in block 415, the first user device 102 may exchange access point information 205 with the second user device 128. For example, the first user device 102 may transmit first access point information to the second user device 128 and receive second access point information from the second user device 128. Conversely, the second user device 128 may receive the first access point in formation from the first user device 102 and transmit the second access point information to the first user device 102. It will be appreciated that the first access point information may be stored on the first user device 102 and may relate to one or more wireless access points 118 in communication with the first user device 102. Similarly, the second access point information may be stored on the second user device 128 and may relate to one or more wireless access point in communication with the second user device 128.

In block 420, the first user device 102 may determine, based on access point information 205, whether the wireless access point 118 is operating in a radar transmission channel. For example, as previously discussed, the access point information 205 may include frequency information 220 and/or channel information 225. One or both of the frequency information 220 and channel information 225 may indicate whether the wireless access point 118 is operating in a radar transmission channel. For instance, in certain embodiments, the first user device 102 may determine that the wireless access point 118 may be operating in a radar transmission channel if the frequency information 220 indicates a 5 Gigahertz frequency band. Alternatively, the first user device 102 may determine that the wireless access point 118 may be operating in a radar transmission channel if the channel information 230 indicates a channel number associated with the radar transmission channel.

Upon a negative determination that the wireless access point 118 is not operating in a radar transmission channel, the method 400 may proceed to block 425. In block 425, the first user device 102 may establish a wireless peer-to-peer connection with the second user device 128 in a non-radar transmission channel. Otherwise, upon a positive determination that the wireless access point 118 is indeed operating in a radar transmission channel, the method 400 may proceed to block 430. In block 430, the first user device 102 may be configured to determine whether the second user device 128 is in communication with the same wireless access point 118 as the first user device 102. For example, the first user device 102 may access the first access point information, which may be stored on first user device 102 itself. The first user device 102 may also access the received second access point information from the second user device 128. Furthermore, the first access point information and the second access point information may include a first access point identifier and a second access point identifier, respectively. As such, the first user device 102 may determine whether the first access point identifier matches the second access point identifier. To this end, a positive match may indicate that the first user device 102 and the second user device 128 are in communication with the same wireless access point 118.

Upon a positive determination that the first user device 102 and the second user device are in communication with the same wireless access point 118, the method 400 may proceed to block 440. In block 440, the first user device 102 may be configured to establish a wireless peer-to-peer connection with the second user device 128 in the radar transmission channel. Otherwise, upon a negative determination that the first user device 102 and the second user device 128 are not in communication with the same access point 118, the method 400 may proceed to block 435.

In block 435, the first user device 102 may be configured to determine whether the second user device 128 is able to detect the presence of the wireless access point 118. Upon a negative determination that the second user device 128 is unable to detect the wireless access point 118, the method may proceed to block 425 to establish a wireless peer-to-peer connection between the first user device 102 and the second user device 128 in a non-radar transmission channel. Otherwise, upon a positive determination that the second user device 128 is able to detect the wireless access point 118, the method 400 may proceed to block 445. In block 445, the first user device 102 may establish a wireless peer-to-peer connection with the second user device 128 in the radar transmission channel. Furthermore, the first user device 102 may be designated as the group owner for the wireless peer-to-peer connection.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a method for wireless communication, comprising receiving, by a first computer comprising one or more processors from a second computer, a request to initiate wireless communication, the first computer in communication with a wireless access point; storing, by the first computer, a first wireless access point identifier associated with the wireless access point; determining, by the first computer, that the wireless access point is communicating in a radar transmission channel; receiving, by the first computer, a second wireless access point identifier associated with the second computer; determining, by the first computer, whether the first wireless access point identifier matches the second wireless access point identifier; and establishing, by the first computer based at least in part upon a positive determination that the first wireless access point identifier matches the second wireless access point identifier, wireless peer-to-peer communication between the first computer and the second computer in the radar transmission channel.

In Example 2, the subject matter of Example 1 can optionally include receiving, from the wireless access point, instructions to vacate the radar transmission channel.

In Example 3, the subject matter of Example 2 can optionally include re-establishing, by the first computer in response to the instructions from the wireless access point, the wireless communication with the second computer in a non-radar transmission channel.

In Example 4, the subject matter of Example 1 or 2 can optionally include that the radar transmission channel is a dynamic frequency selection channel In Example 5, the subject matter of Example 1 or 2 can optionally include that establishing the wireless peer-to-peer communication between the first computer and the second computer comprises establishing a Wi-Fi Direct connection.

Example 6 is a device for wireless communication, comprising: a transceiver; at least one processor; and at least one memory storing computer-executable instructions, that when executed by the at least one processor, causes the at least one processor to: establish communication with a wireless access point; receive, by the transceiver from a second device, discovery information associated with the second device; determine, based at least in part on the discovery information, whether the second device is in communication with the wireless access point; determine whether the wireless access point is operating in a radar transmission channel; and establish, upon a positive determination that the second device is in communication with the wireless access point and upon a positive determination that the wireless access point is operating in a radar transmission channel, a wireless peer-to-peer connection with the second device in the radar transmission channel In Example 7, the subject matter of Example 6 can optionally include that the computer-executable instructions to determine whether the second device is in communication with the wireless access point further comprises computer-executable instructions that cause the at least one processor to: determine a first access point identifier associated with the wireless access point; receive, by the transceiver from the second device, a second access point identifier; and determine whether the first access point identifier matches the second access point identifier.

In Example 8, the subject matter of Example 7 can optionally include that the second access point identifier is included in the discovery information received from the second device.

In Example 9, the subject matter of Example 6 can optionally include that the computer-executable further cause the at least one processor to: determine, upon a negative determination that the second device is not in communication with the wireless access point, whether the second device is able to detect the presence of the wireless access point.

In Example 10, the subject matter of Example 6 can optionally include that the computer-executable instructions further cause the at least one processor to: establish, based at least in part upon a positive determination that the second device is able to detect the presence of the wireless access point and upon a positive determination that the wireless access point is operating in a radar transmission channel, a wireless peer-to-peer connection with the second device in the radar transmission channel; and designate the device as a group owner of the wireless peer-to-peer connection.

In Example 11, the subject matter of Example 6 can optionally include that the computer-executable instructions further cause the at least one processor to: receive, from the wireless access point, instructions to vacate the radar transmission channel.

In Example 12, the subject matter of Example 11 can optionally include that the computer-executable instructions further cause the at least one processor to: re-establish, in response to the instructions from the wireless access point, the wireless peer-to-peer communication with the second device in a non-radar transmission channel.

In Example 13, the subject matter of Example 6 can optionally include that the radar transmission channel is a dynamic frequency selection channel.

In Example 14, the subject matter of Example 6 can optionally include that the wireless peer-to-peer connection comprises a Wi-Fi Direct connection.

Example 15 is a non-transitory computer-readable medium comprising instructions, that when executed by at least one processor, cause the at least one processor to: establish communication with a wireless access point; receive, from a second device, discovery information associated with the second device; determine, based at least in part on the discovery information, whether the second device is in communication with the wireless access point; determine whether the wireless access point is operating in a radar transmission channel; and establish, upon a positive determination that the second device is in communication with the wireless access point and upon a positive determination that the wireless access point is operating in a radar transmission channel, a wireless peer-to-peer connection with the second device in the radar transmission channel.

In Example 16, the subject matter of Example 15 can optionally include that the computer-executable instructions to determine whether the second device is in communication with the wireless access point further comprises computer-executable instructions that cause the at least one processor to determine a first access point identifier associated with the wireless access point; receive, by the transceiver from the second device, a second access point identifier; and determine whether the first access point identifier matches the second access point identifier.

In Example 17, the subject matter of Example 16 can optionally include that the second access point identifier is included in the discovery information received from the second device.

In Example 18, the subject matter of Example 15 can optionally include that the instructions further cause the at least one processor to: determine, upon a negative determination that the second device is not in communication with the wireless access point, whether the second device is able to detect the presence of the wireless access point.

In Example 19, the subject matter of Example 18 can optionally include that the instructions further cause the at least one processor to: establish, based at least in part upon a positive determination that the second device is able to detect the presence of the wireless access point and upon a positive determination that the wireless access point is operating in a radar transmission channel, a wireless peerto-peer connection with the second device in the radar transmission channel; and designate the device as a group owner of the wireless peer-to-peer connection.

In Example 20, the subject matter of Example 15 can optionally include that the instructions further cause the at least one processor to: receive, from the wireless access point, instructions to vacate the radar transmission channel.

In Example 21, the subject matter of Example 20 can optionally include that the instructions further cause the at least one processor to: re-establish, in response to the instructions from the wireless access point, the wireless peer-to-peer communication with the second device in a non-radar transmission channel.

In Example 22, the subject matter of Example 15 can optionally include that the radar transmission channel is a dynamic frequency selection channel.

In Example 23, the subject matter of Example 15 can optionally include that the wireless peer-to-peer connection comprises a Wi-Fi Direct connection.

Example 24 is an apparatus comprising: means for establishing communication with a wireless access point; means for receiving, by the transceiver from a second device, discovery information associated with the second device; means for determining, based at least in part on the discovery information, whether the second device is in communication with the wireless access point; means for determining whether the wireless access point is operating in a radar transmission channel; and means for establishing, upon a positive determination that the second device is in communication with the wireless access point and upon a positive determination that the wireless access point is operating in a radar transmission channel, a wireless peer-to-peer connection with the second device in the radar transmission channel.

In Example 25, the subject matter of Example 24 can optionally include that the means for determining whether the second device is in communication with the wireless access point further comprises: means for determining a first access point identifier associated with the wireless access point; means for receiving, by the transceiver from the second device, a second access point identifier; and means for determining whether the first access point identifier matches the second access point identifier.

In Example 26, the subject matter of Example 25 can optionally include that the second access point identifier is included in the discovery information received from the second device.

In Example 27, the subject matter of Example 24 can optionally include means for determining, upon a negative determination that the second device is not in communication with the wireless access point, whether the second device is able to detect the presence of the wireless access point.

In Example 28, the subject matter of Example 27 can optionally include means for establishing, based at least in part upon a positive determination that the second device is able to detect the presence of the wireless access point and upon a positive determination that the wireless access point is operating in a radar transmission channel, a wireless peer-to-peer connection with the second device in the radar transmission channel; and means for designating the device as a group owner of the wireless peer-to-peer connection.

In Example 29, the subject matter of Example 24 can optionally include means for receiving, from the wireless access point, instructions to vacate the radar transmission channel.

In Example 30, the subject matter of Example 29 can optionally include means for re-establishing, in response to the instructions from the wireless access point, the wireless peer-to-peer communication with the second device in a non-radar transmission channel.

In Example 31, the subject matter of Example 24 can optionally include that the radar transmission channel is a dynamic frequency selection channel In Example 32, the subject matter of Example 24 can optionally include that the wireless peer-to-peer connection comprises a Wi-Fi Direct connection.

What is claimed is:

1. A method, comprising:
receiving, by a first computer comprising one or more processors from a second computer, a request to initiate wireless communication, the first computer in communication with a wireless access point;
storing, by the first computer, a first wireless access point identifier associated with the wireless access point;
determining, by the first computer, that the wireless access point is communicating in a radar transmission channel using frequency information received from the wireless access point, the frequency information indicating a predetermined frequency band;
receiving, by the first computer, a second wireless access point identifier associated with the second computer;
determining, by the first computer, whether the first wireless access point identifier matches the second wireless access point identifier;
establishing, by the first computer based at least in part upon a positive determination that the first wireless access point identifier matches the second wireless access point identifier, wireless peer-to-peer communication between the first computer and the second computer in the radar transmission channel;
determining, by the first computer, upon a determination that the second computer is not in communication with the wireless access point, whether the second computer is able to detect the presence of the wireless access point; and
establishing, by the first computer, based at least in part upon a determination that the second computer is not able to detect the presence of the wireless access point and upon a determination that the wireless access point is operating in a radar transmission channel, a wireless peer-to-peer connection with the second computer in a non-radar transmission channel.

2. The method of claim 1, further comprising receiving, from the wireless access point, instructions to vacate the radar transmission channel.

3. The method of claim 2, further comprising re-establishing, by the first computer in response to the instructions from the wireless access point, the wireless communication with the second computer in the non-radar transmission channel.

4. The method of claim 1, wherein the radar transmission channel is a dynamic frequency selection channel.

5. The method of claim 1, wherein establishing the wireless peer-to-peer communication between the first computer and the second computer comprises establishing a Wi-Fi Direct connection.

6. A device, comprising:
a transceiver;
at least one processor; and
at least one memory storing computer-executable instructions, that when executed by the at least one processor, causes the at least one processor to:

establish communication with a wireless access point;
receive, by the transceiver from a second device, discovery information associated with the second device;
determine, based at least in part on the discovery information, whether the second device is in communication with the wireless access point;
determine whether the wireless access point is operating in a radar transmission channel using frequency information received from the wireless access point, the frequency information indicating a predetermined frequency band;
establish, upon a positive determination that the second device is in communication with the wireless access point and upon a positive determination that the wireless access point is operating in a radar transmission channel, a wireless peer-to-peer connection with the second device in the radar transmission channel;
determine, upon a determination that the second device is not in communication with the wireless access point, whether the second device is able to detect the presence of the wireless access point; and
establish, based at least in part upon a determination that the second device is not able to detect the presence of the wireless access point and upon a determination that the wireless access point is operating in a radar transmission channel, a wireless peer-to-peer connection with the second device in a non-radar transmission channel.

7. The device of claim 6, wherein the computer-executable instructions to determine whether the second device is in communication with the wireless access point further comprises computer-executable instructions that cause the at least one processor to:
determine a first access point identifier associated with the wireless access point;
receive, by the transceiver from the second device, a second access point identifier; and
determine whether the first access point identifier matches the second access point identifier.

8. The device of claim 7, wherein the second access point identifier is included in the discovery information received from the second device.

9. The device of claim 1, wherein the computer-executable instructions further cause the at least one processor to:
designate the device as a group owner of the wireless peer-to-peer connection.

10. The device of claim 6, wherein the computer-executable instructions further cause the at least one processor to:
receive, from the wireless access point, instructions to vacate the radar transmission channel.

11. The device of claim 10, wherein the computer-executable instructions further cause the at least one processor to:
re-establish, in response to the instructions from the wireless access point, the wireless peer-to-peer communication with the second device in the non-radar transmission channel.

12. The device of claim 6, wherein the radar transmission channel is a dynamic frequency selection channel.

13. The device of claim 6, wherein the wireless peer-to-peer connection comprises a Wi-Fi Direct connection.

14. A non-transitory computer-readable medium comprising instructions, that when executed by at least one processor, cause the at least one processor to:
establish communication with a wireless access point;
receive, from a second device, discovery information associated with the second device;
determine, based at least in part on the discovery information, whether the second device is in communication with the wireless access point;
determine whether the wireless access point is operating in a radar transmission channel using frequency information received from the wireless access point, the frequency information indicating a predetermined frequency band, the predetermined frequency band comprising a range of operating frequencies;
establish, upon a positive determination that the second device is in communication with the wireless access point and upon a positive determination that the wireless access point is operating in a radar transmission channel, a wireless peer-to-peer connection with the second device in the radar transmission channel;
determine, upon a determination that the second device is not in communication with the wireless access point, whether the second device is able to detect the presence of the wireless access point; and
establish, based at least in part upon a determination that the second device is not able to detect the presence of the wireless access point and upon a determination that the wireless access point is operating in a radar transmission channel, a wireless peer-to-peer connection with the second device in a non-radar transmission channel.

15. The computer-readable medium of claim 14, wherein the computer-executable instructions to determine whether the second device is in communication with the wireless access point further comprises computer-executable instructions that cause the at least one processor to:
determine a first access point identifier associated with the wireless access point;
receive, by the transceiver from the second device, a second access point identifier; and
determine whether the first access point identifier matches the second access point identifier.

16. The computer-readable medium of claim 15, wherein the second access point identifier is included in the discovery information received from the second device.

17. The computer-readable medium of claim 14, wherein the instructions further cause the at least one processor to:
receive, from the wireless access point, instructions to vacate the radar transmission channel.

18. The computer-readable medium of claim 17, wherein the instructions further cause the at least one processor to:
re-establish, in response to the instructions from the wireless access point, the wireless peer-to-peer communication with the second device in the non-radar transmission channel.

19. The computer-readable medium of claim 14, wherein the radar transmission channel is a dynamic frequency selection channel.

20. The computer-readable medium of claim 14, wherein the wireless peer-to-peer connection comprises a Wi-Fi Direct connection.

* * * * *